United States Patent [19]

Miller et al.

[11] 3,964,399
[45] June 22, 1976

[54] RAILWAY GONDOLA CAR

[75] Inventors: Roy W. Miller, Highland; Jack E. Gutridge, Dyer, both of Ind.

[73] Assignee: Pullman Incorporated, Chicago, Ill.

[22] Filed: May 5, 1975

[21] Appl. No.: 574,481

[52] U.S. Cl. .......................... 105/406 R; 105/411; 105/413; 105/422
[51] Int. Cl.² ...................................... B61D 17/10
[58] Field of Search ............. 105/406 R, 404, 407, 105/409, 410, 411, 422, 419, 413, 414, 406 A, 367, 366 R

[56] References Cited
UNITED STATES PATENTS

| | | | |
|---|---|---|---|
| 972,708 | 10/1910 | McKeen, Jr. | 105/407 |
| 1,641,885 | 9/1927 | Gardner | 105/406 R |
| 2,146,221 | 2/1939 | Meyer et al. | 105/406 R |
| 3,240,168 | 3/1966 | Charles et al. | 105/406 R |

Primary Examiner—Robert J. Spar
Assistant Examiner—James M. Slattery
Attorney, Agent, or Firm—Richard J. Myers

[57] ABSTRACT

A railway gondola car includes a depressed floor section with underframe cross members placed below the centersill, with the cross members extending completely across the width of the car. The opposite ends of the gondola car are provided with elevated floors and the car includes a simplified and reinforced construction for minimizing structural damage to the car during operation.

10 Claims, 12 Drawing Figures

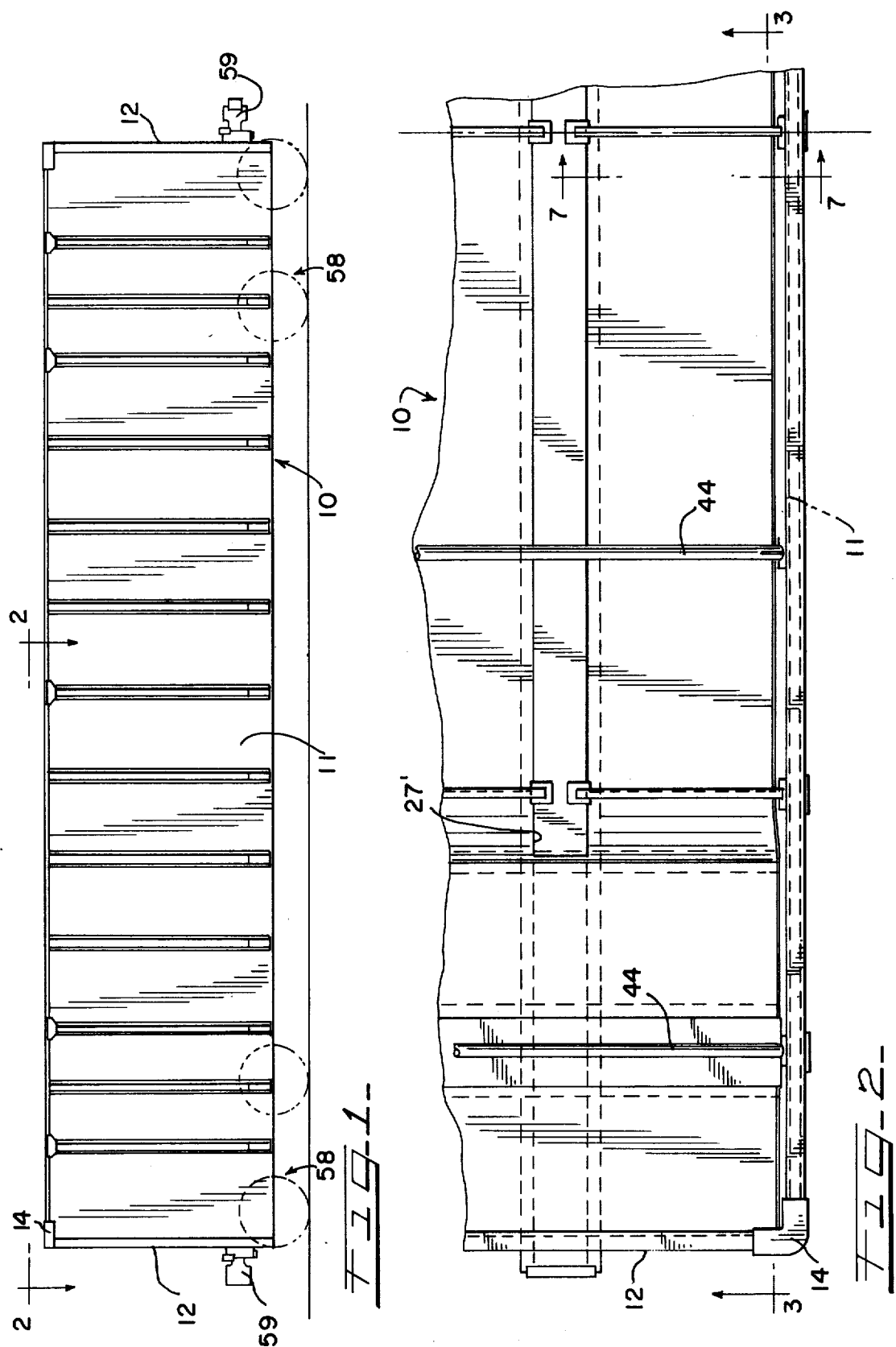

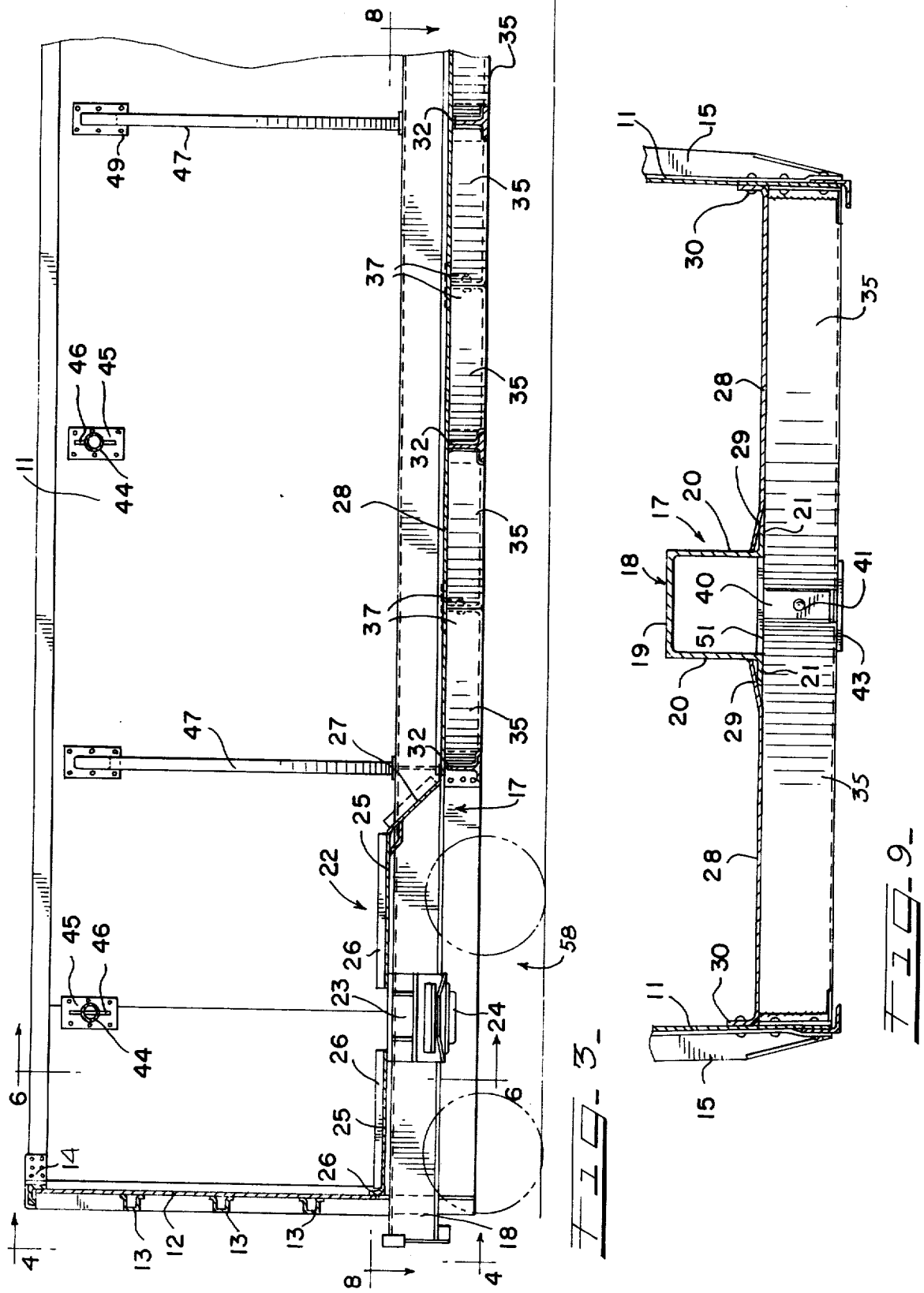

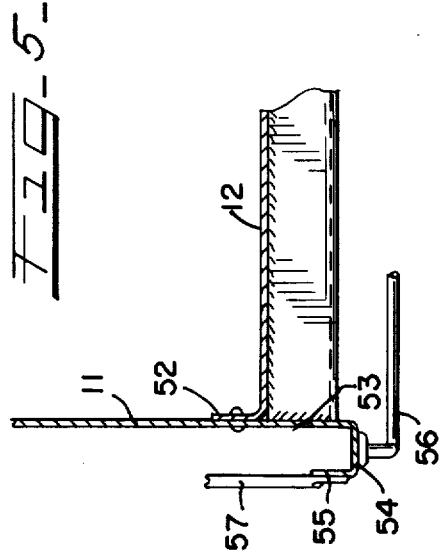
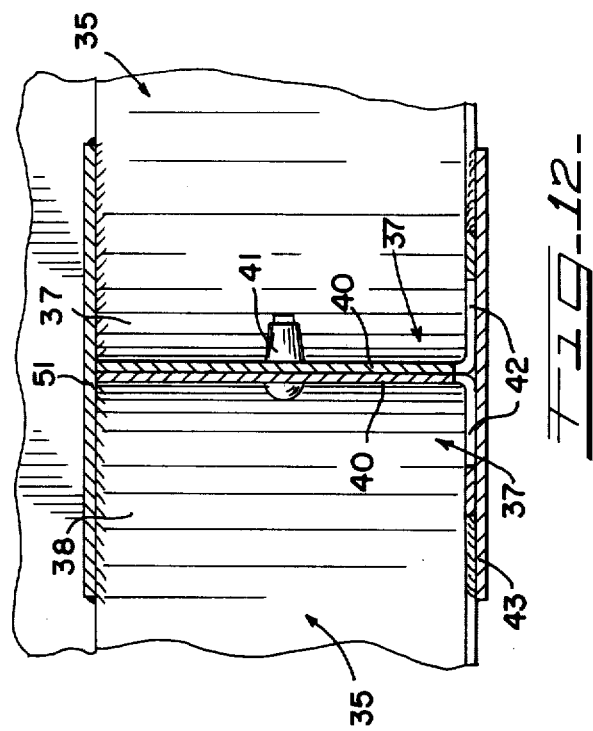
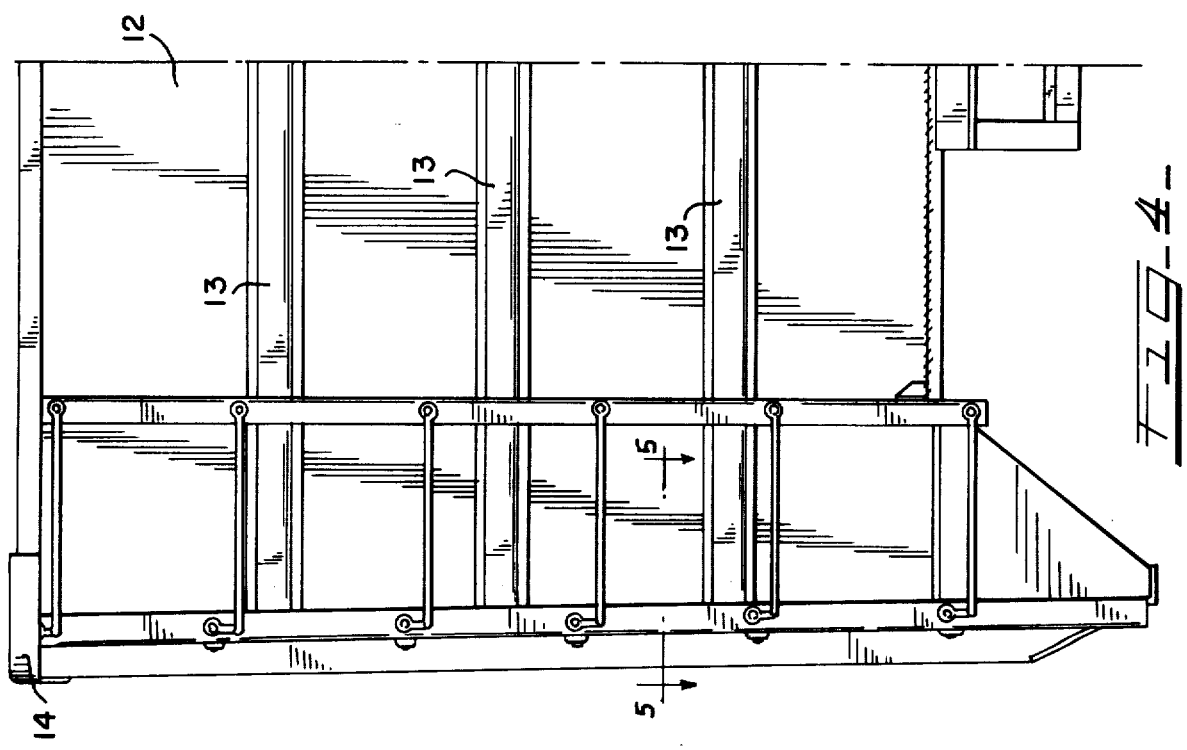

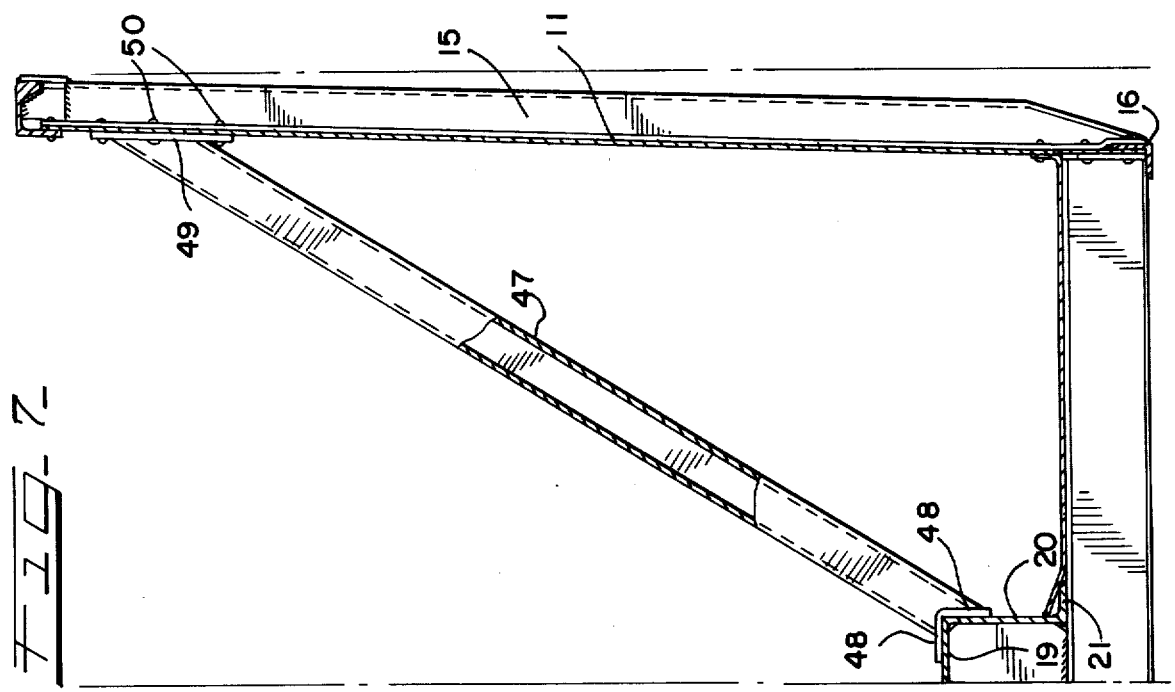
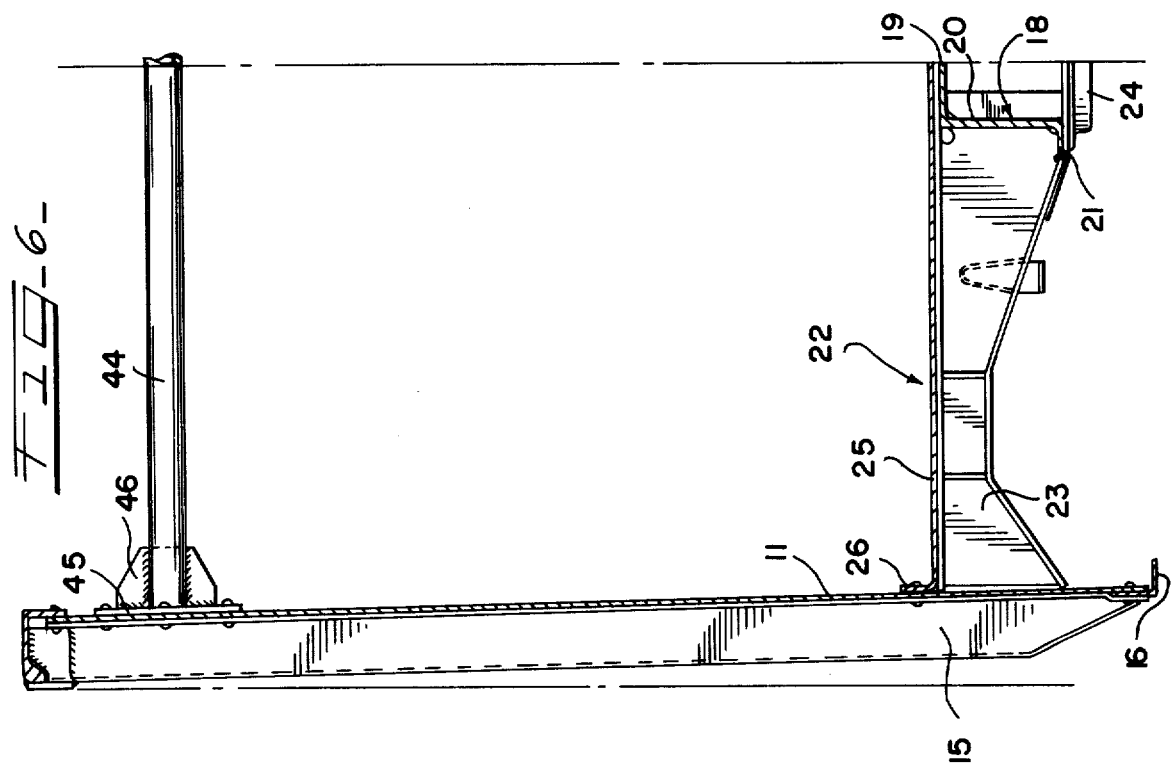

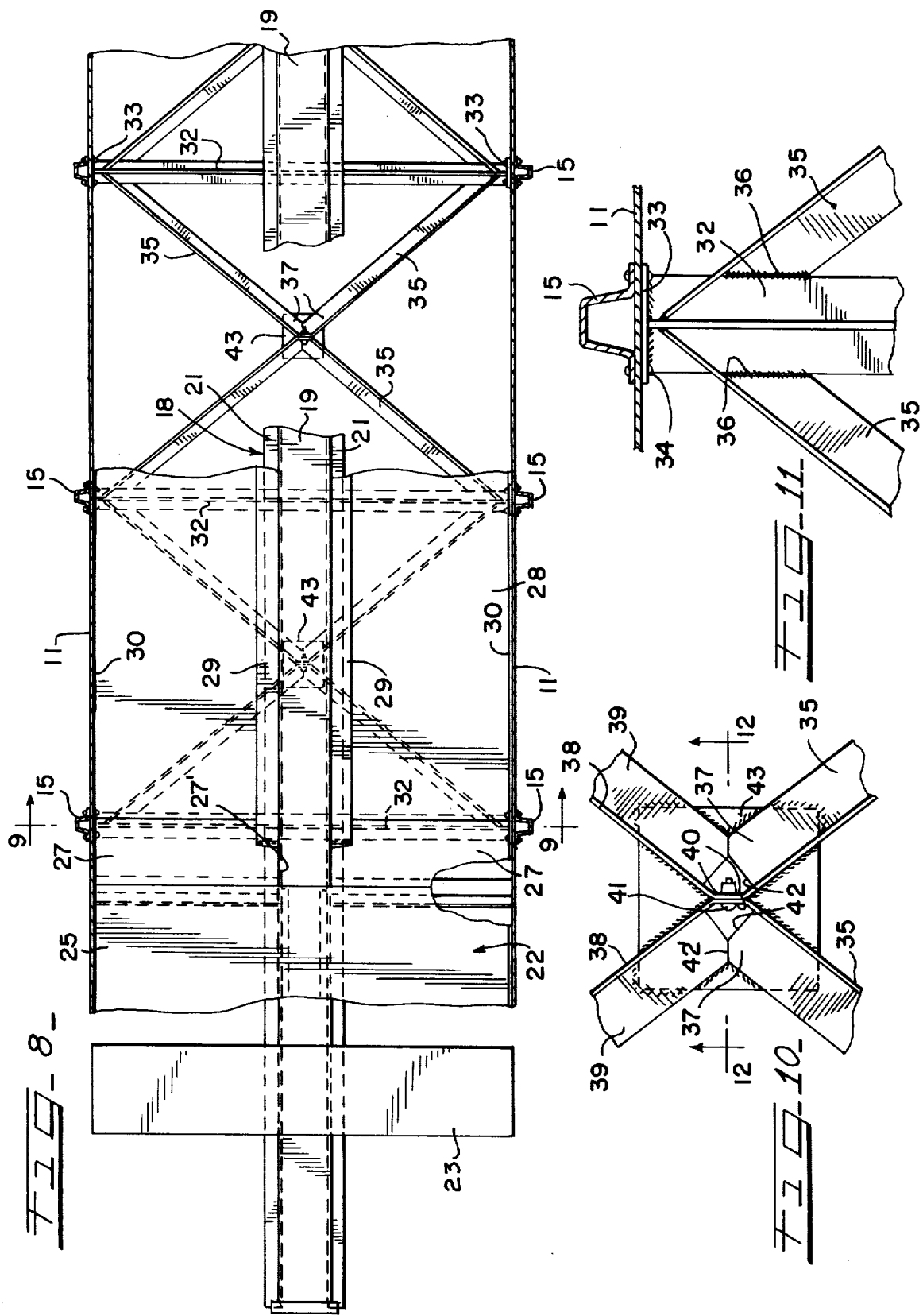

3,964,399

RAILWAY GONDOLA CAR

BACKGROUND OF THE INVENTION

1. Field of the Invention

This railway car is of the gondola type which includes a basically open top shell construction. Cars of this type are particularly useful in unit train operation and may be utilized for hauling coal or other such materials with the cars being readily adapted for rotary discharge operation.

2. Description of the prior art

Railway gondolas of conventional design and construction are provided with a car floor which is supported and rests upon the top of a centersill projecting outwardly from opposite ends of the car. The floor is supported by cross bearers which are connected at their inner ends to the webs of the centersill and extend outwardly from opposite sides thereof to the sidesills and thereby support the floor assembly. The gondolas are used in many instances in unit train operation and includes the rotary type of coupler which permits rotary discharge of each of the cars without uncoupling the train of cars. The gondolas of the prior art are subject to high maintenance costs because of body fractures resulting from rotary dumping and other train operation. Repairs are frequent and down time costs are high. The present improved design, to a great extent, solves the problems encountered by the conventional gondolas exemplified in the prior art.

SUMMARY OF THE INVENTION

The present invention comprises an improved gondola having a torsion resistant underframe which is especially adapted for unit train coal operations wherein the cars travel over relatively poor track at high speeds. Also the present car is particularly suited to the rotary discharge operation wherein rotary couplers premit the inversion of the car for discharge without uncoupling the train. The gondola car of the present design utilizes a depressed floor section whereby the underframe cross members between the wheels are placed below the centersill instead of being framed into the centersill as is conventional in the prior art. This simplified design permits the use of one piece cross members and eliminates the need of butt joint connections and interior filler plates in the centersill. The opposite ends of the car are provided with a floor structure which extends across the top of the centersill and includes a transition section through which the centersill is positioned with the depressed floor supported below the centersill. With the present arrangement the construction includes diagonal cross members which stiffen the underframe against racking horizontally and twisting from end to end. The diagonal sections or cross members extend from the body cross bearers at their sidesill connection diagonally with the diagonal sections interconnected at the middle of the span by a single riveted connection.

The gondola body further includes tubular reinforcing cross members which support the body and also diagonal stiffener members which are rigidly connected to the top of the centersill and extend outwardly to a rigid connection to the sidewall and side posts of the car.

BRIEF DESCRIPTION OF THE DRAWINGS

FIG. 1 is a side elevational view of a railway gondola car;

FIG. 2 is an enlarged plan view of a portion of a gondola car taken substantially along the line 2—2 of FIG. 1;

FIG. 3 is a cross-sectional view taken substantially along the line 3—3 of FIG. 2;

FIG. 4 is a partial elevational view taken substantially along the line 4—4 of FIG. 3;

FIG. 5 is a cross-sectional view of a corner construction taken substantially along the line 5—5 of FIG. 4;

FIG. 6 is a cross-sectional view taken substantially along the line 6—6 of FIG. 3;

FIG. 7 is a partial cross-sectional view taken substantially along the line 7—7 of FIG. 2;

FIG. 8 is a cross-sectional view of a gondola car underframe taken substantially along the line 8—8 of FIG. 3;

FIG. 9 is a cross-sectional view taken substantially along the line 9—9 of FIG. 8;

FIG. 10 is an enlarged view of the interconnection of diagonal support members;

FIG. 11 is an enlarged detailed view showing the interconnection of diagonal support members with cross bearer members, and FIG. 12 is a cross-sectional view taken substantially along the line 12—12 of FIG. 10.

DESCRIPTION OF THE PREFERRED EMBODIMENT

A gondola railway car 10, as shown particularly in FIG. 1, includes vertical sides or side walls 11 and end walls 12. The end walls 12 are reinforced by horizontally extending tubular cross braces 13 conventional in the art. The railway car 10 is supported on wheel trucks 58 also well known in the art. The upper edges of the vertical sides 11 and end walls 12 include corner end capping elements 14 to provide for rigidity at the upper ends of said sides and walls. The car also includes relatively conventional vertically extending hat-shaped outer posts 15 positioned in horizontally spaced relation. The lower ends of the side walls 11 are suitably connected to longitudinally extending angle shaped sidesills 16.

The railway car 10 includes an underframe 17 including an elongated hat-shaped centersill 18. The centersill 18 comprises a top wall 19 connected to downwardly extending side webs 20 integral with outwardly extending flanges 21. The centersill 18 extends the length of the car and projects outwardly at opposite ends thereof. Elevated floor structures 22, generally designated, include a bolster structure 23 supporting at its lower central end a body center plate 24. The floor structure 22 includes a metal floor plating 25 connected to the end walls 12 and vertical sides 11 by means of outwardly extending flanges 26 the connection being by welded construction. The metal floor plating 25 extends inwardly and is connected to a transition section 27 as best shown in FIGS. 2 and 8 which includes openings 27' through which the centersill 18 extends. The transition section 27 of the floor structure 22 is connected to a depressed floor section or plate 28 generally designated. As best shown in FIGS. 3 and 9, the floor sections 28 are connected to the side walls 11 and vertical posts 15 by means of flanges 30 in welded connecting relation. The floor sections 28 also include upwardly inclined plate portions 29 which are suitably connected to the flanges 21 and to the webs 20 of the centersill 18. As best shown in FIGS. 3, 8 and 11, T-shaped cross members 32 extend completely across the car underneath the floor plates 28 and are connected by means of plates 33 to the sides 11 and outer posts 15. The connection is of a riveted type, as designated by the reference character 34 in FIG. 11. As best shown in FIG. 8, the T-shaped cross members 32 are also interconnected by a diagonal support members or cross braces 35, the same being angle shaped and having welded ends 36 suitably secured to the flanges of the T-shaped cross members 32. Each of the diagonal support members 35 includes a central connector portion or section 37 formed by an upright flange or wall 38 connected to a horizontal flange or wall 39. As best shown in FIG. 10, the walls 38 include a laterally extending portion 40 with the portions 40 of adjacent diagonals being interconnected by means of a two-piece rivet 41. The diagonal support members 35 are formed from a one-piece angle which is suitably notched as indicated at 42, and cut as indicated at 42' so that it can easily be bent into the desired shape shown in FIG. 10. As best shown in FIGS. 9 and 10, a lower rectangular plate 43 is rigidly welded to the sections 37 to further provide a strong connection of the diagonal members. The upper ends of the sections 37 are also rigidly welded to a plate 51 which is best shown in FIG. 9 is suitably supported within the webs 20 of the sill structure 18.

As best shown in FIG. 2, the gondola car is further reinforced and stabilized by cross supports or members 44 of tubular shape having end plates 45. The plates 45 are connected as indicated in FIG. 6 by gussets 46 and rivets extending through the side wall 11 and through the flanges of the posts 15. Further, torsional stability is provided by means of a plurality of diagonal body braces or members 47 connected inside the body of the car. The diagonal inner body braces 47 are provided at their lower ends with an angle bracket 48, each of said brackets being rigidly welded to the top of wall 19 and sides 20 of the centersill. As shown in FIG. 7, each of the braces 47 is further connected by means of plates 49 and rivets 50 extending through the plate 49 the side walls 11 and flanges of the door post 15. As best shown in FIG. 5, the end walls 12 are also connected by means of riveted flanges 52 to the extension 53 of the side walls 11. The ends of the extension 53 are integrally formed with an outwardly or laterally extending portion or flange 54 which is connected to an inwardly extending flange 55 to provide a U-shaped structure, the said flanges 55 extending toward each other from opposite ends of the car in substantially parallel relation with respect to the side walls 11. The flanges 54 and 55 provide for suitable connection at one end of conventional ladders 56 and 57 supported on the ends and adjacent sides of the body of the car.

As shown in FIG. 1, the gondola car and underframe is adapted to be supported on conventional wheel trucks 58 provided with truck centerplates (not shown) adapted to be secured to the body centerplates 24 of the car. The type of gondola disclosed is adapted to be used in railway unit train operation and includes the conventional type of rotary coupler 59 permitting the car to be inverted for discharge of coal or other materials into a suitable pit disposed beneath the track, the latter being conventional and not being disclosed in detail. An important feature of this car is the depressed underframe design featuring the cross bearers and cross members passing below the centersill of the car instead of on the same level or above the centersill as is provided in the prior art. This greatly simplifies construction of the car since the cross members are of one piece design. The cross members are welded to the flanges 21 of the centersill by lapping rather than the conventional type which must consist of individual pieces which have to be cut to fit and then butt welded to the centersill. The present arrangement is simplified and provides a greatly improved construction. Similarly, the floor sections 28 are in two elongated pieces and at their outer ends are provided with a flange connection 30, and the inner ends are securely welded to the center sill by means of the diagonally extending portions 29. The plates 25 provided at the ends of the car, which are disposed on top of the centersill, may comprise a single piece which is notched and then merges to the transition section into the two piece arrangement shown in FIG. 9. The depressed section construction permits lowering of the lading area thus permitting a lower profile car that will carry the same amount of lading as higher cars. Thus the height of the car can be materially reduced and the same amount of lading can be carried with this particular arrangement.

A further advantage of the car is the lower center of gravity which is desirable for roadability at high train speed. While a lower car is indicated, it is also possible to increase the height of the car and still remain within the A.A.R. clearance line limitations since the lower profile of the center portion of the car floor provides for a lower center of gravity. The car also further has the advantages of certain areas comprising a riveted construction while the underframe and ends of the car are welded assembly. The car is further reinforced at the top by the corner and upper capping construction 14.

As indicated and described above, the car 10 also includes three sets of diagonal cross braces 35 connected into the cross bearer or T-beam structures 32. The side posts 15 at the point of connection of the cross bearers 32 and the diagonals 35 are also connected through the side walls 11 and to side posts 15 as indicated. In conventional unit train operating conditions, the coal car or gondolas travel over poor road beds at high speeds. The action imparted to the body of the freight car due to the uneven track, causes a twisting and racking of the frame work of the car. This working of the body frame is concentrated at the car corners causing body fractures and high maintenance costs. With the present design which includes a depressed floor section, the cross members between the wheels are placed below the centersill instead of being framed into the centersill. This simplified design permits the use of one piece cross members and eliminates the need of butt joint constructions and interior filler plates in the centersill. Also greater strengthened stability results.

This type of construction permits the use of diagonal cross members to stiffen the underframe against racking horizontally and twisting from end to end. The diagonal members extend from the body cross bearer at its side connection to the middle of the span half way to its neighboring cross bearer and then back again to its original cross bearer at its connection to the other side. The two diagonal sections contact each other at the middle of the span and are secured together by the two piece rivets as indicated. Thus, horizontal racking is prevented because of direct tension and compression of the diagonal members and the twisting is reduced through the beam action of the diagonal members. Due to the connection of these members at the centers, the raising and lowering action on the beams, due to the body twist, tend to cancel each other out. Thus, with the further use of the interior diagonal members 47 and the cross members 44, a very stable and structurally sound gondola body is provided which will achieve the goals of a low maintenance cost car requiring little repair and down time.

What is claimed is:

1. A railway car supported on spaced car trucks and including a body having vertical sides and end walls, the improvement comprising,
    an underframe including a longitudinally extending center sill,
    floor portions disposed at opposite ends of said car providing first elevated floor structures,
    a bolster structure connected to said sides, floor portions and to said center sill on opposite sides thereof,
    a second central depressed floor structure positioned between the ends and below said first floor structures,
    said second structure including a floor having inner end portions connected to said center sill adjacent lower portions thereof,
    a plurality of longitudinally spaced vertical and continuous cross members connected at opposite ends to said side walls and having upper portions thereof connected to the underneath side of said floor for supporting the same,
    said cross members having vertical walls extending downwardly from said center sill,
    diagonal support members extending diagonally below said center sill and connected to said depressed floor structure for supporting the same,
    said support members having first end portion connected to said cross members adjacent their connection to said side walls, and
    means connecting intermediate portions of said support members to each other and to said center sill whereby said support members provide a criss-cross configuration between said cross members.

2. The invention in accordance with claim 1, including vertical side posts connected to said sides and to said cross members.

3. The invention in accordance with claim 1, including diagonal braces within said body,
    said diagonal braces including means connecting a lower portion of said braces to said center sill above said depressed floor, and means connecting upper portions of said braces to said side walls, and vertical side posts connected to said side walls and said diagonal braces.

4. The invention in accordance with claim 1, said means connecting said diagonal support members to said center sill including horizontal plate means connected to upper and lower portions of said support members adjacent their point of connection to said center sill,
    said upper plate means being connected to vertical walls on said center sill.

5. The invention in accordance with claim 1,
    said diagonal support members including flanged beams having vertical flanges,
    said support members each comprising two of said beams connected in V-shaped configuration, whereby the beams of one support member are substantially linearly aligned with the beams of a connected support member to provide said criss-cross configuration.

6. The invention in accordance with claim 5, said means connecting said support members including a stud connected through adjacent vertical flanges of said beams.

7. The invention in accordance with claim 1, said center sill including vertical side walls and outwardly projecting lower flanges,
    said inner portions of said depressed floors being connected to said center sill adjacent to said lower flanges.

8. The invention in accordance with claim 3, including horizontal cross braces connected to said sides within said body and to said side posts.

9. The invention in accordance with claim 1, said depressed floor structure including flanges at outer ends thereof connected to said sides within said body.

10. The invention in accordance with claim 1, said end walls including vertical sheets,
    said sheets including inwardly turned flanges connected to the sides within said body,
    and said sheets being spaced longitudinally inwardly from the ends of said sides whereby said sides include portions projecting outwardly from said end walls,
    a plurality of horizontally and vertically spaced reinforcements connected to said projecting portions of said sides and to said end walls,
    said projecting portions including outwardly projecting first vertical flanges normal to said projecting portions and second vertical flanges connected to said first flanges,
    said second flanges being parallel to said sides and extending normal to said first flanges to provide a U-shaped configuration with said projecting portions.

* * * * *